United States Patent Office 2,811,543
Patented Oct. 29, 1957

2,811,543

PHOSPHOROTHIOLATES HAVING INSECTICIDAL PROPERTIES, AND METHOD OF MAKING SAME

Harry W. Coover, Jr., and Joseph B. Dickey, Kingsport, Tenn., assignors to Eastman Kodak Company, Rochester, N. Y., a corporation of New Jersey No Drawing. Application August 31, 1955,
Serial No. 531,811

10 Claims. (Cl. 260—461)

This application is a continuation-in-part of our copending application Serial No. 301,956, filed July 31, 1952.

This invention relates to certain new organo phosphorus compounds and to a method of preparing them. More particularly, this invention relates to compounds resulting from reaction of perchloromethylmercaptan and a trialkyl or triaryl phosphite or sodium salt of a dialkyl or diaryl hydrogen phosphite. The exact structure of the reaction product is not known, however, the reaction probably takes place as follows:

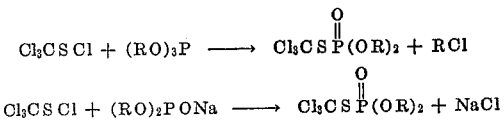

The compounds obtained from the practice of our invention are particularly valuable as insecticides. They are also useful as intermediates in the synthesis of other chemicals. They can be called O,O-dialkyl or diaryl-S-trichloromethyl phosphorothiolate.

We have found that perchloromethylmercaptan will react with a trialkyl or triaryl phosphite or with the sodium salt of dialkyl or diaryl hydrogen phosphite to produce hitherto unknown compounds having unexpected insecticidal activity.

Accordingly it is an object of our invention to provide a new reaction as described above and to provide new compounds comprising the products of this reaction.

The following examples will further illustrate the invention.

*Example 1.—O,O-diethyl-S-trichloromethyl phosphorothiolate*

Thirty-seven and two tenths grams of perchloromethylmercaptan was slowly added to 33.2 g. of triethylphosphite in a reaction flask equipped with a stirrer, condenser and dropping funnel and cooled in an ice bath. A vigorous reaction took place as each drop was added. The rate of addition was controlled such that the reaction did not heat up above approximately 10° C. After the addition was complete the reaction mixture was allowed to warm up to room temperature. The ethyl chloride can be removed from the reaction product by warming on a steam bath. The crude product is sufficiently pure for most uses. Purification of the product by distillation results in some loss due to decomposition. The distilled product had a boiling point of 68–73° C./1 mm.

*Example 2.—O,O-dibutyl-S-trichloromethyl phosphorothiolate*

Thirty-seven and two tenths grams of perchloromethylmercaptan was slowly added to 50 g. of tributylphosphite in a reaction flask equipped with a stirrer, condenser and dropping funnel. The reaction flask was cooled in an ice bath. A vigorous reaction took place upon the addition of the perchloromethylmercaptan. The addition rate was controlled so that the temperature did not exceed 10° C. After the addition was completed the reaction mixture was slowly heated to 100° C. Under this condition most of the butyl chloride was removed and the remaining product is sufficiently pure for most uses. Purification of the product by distillation results in some decomposition. The product distilled at 98–103° C./1 mm.

*Example 3*

2.3 g. sodium plus 50 ml. dry toluene were placed in a 3-necked, round bottom flask equipped with dropping funnel, sealed stirrer and reflux condenser closed with calcium chloride. 13.8 g. of diethyl hydrogen phosphite were added through the dropping funnel. After the addition was complete, refluxing and stirring were continued until all of the sodium had reacted. The reaction mixture was cooled in an ice-salt bath and 19.6 g. perchloro methyl mercaptan was added dropwise, keeping the temperature below 10° C. When the addition was completed, the reaction mixture was heated at gentle reflux for one hour. The reaction mixture was washed with water. The organic layer was fractionally distilled and the product, B. P. 68–73° C./1 mm., collected.

Reaction products of other phosphites such as trimethyl, tripropyl, triphenyl, tritoluyl and the like, as well as the sodium salts of the corresponding di-compounds can be readily prepared by reacting them with perchloromethylmercaptan under the same conditions that tributylphosphite was reacted.

UTILITY

O,O-diethyl-S-trichloromethyl phosphorothiolate in three different series of tests of insecticidal powers was found, in 5% mixture with flour, to kill 100% of the flour beetles used in the test in each of the test periods of contact, these periods being in each series, 16 hours, 21 hours and 24 hours, respectively. A D. D. T. standard in the same concentration killed 20%, 35% and 50% of the beetles in the same periods. Use of a blank specimen revealed 0%, 5% and 5% of the beetles dead at the ends of the same periods. At 2% concentration, the O,O-diethyl-S-trichloromethyl phosphorothiolate killed from 80% to 95% in each of the three periods.

One microliter of a 1.0% solution of O,O-diethyl-S-trichloromethyl phosphorothiolate in acetone was applied to the midthoracic point of each of 20 four-day-old female flies. After treatment they were placed in small cyclindical recovery cages and observed after 24 hours. All flies were dead at the end of the 24-hour period.

An aqueous emulsion containing 0.1% O,O-diethyl-S-trichloromethyl phosphorothiolate was prepared. Two bean leaves which were heavily infested with both eggs and adult 2-spotted mites were dipped into this aqueous emulsion and dried in a gentle air stream. These leaves were then placed on damp paper toweling in Petri dishes. A 98% kill of the adult mites was observed after 24 hours. At the end of 1 week, a 67% kill of eggs was observed.

The test against adult mites was repeated at a concentration of 0.03%. At the end of 24 hours, an 83% kill of mites was observed.

We claim:

1. The process for preparing insecticidal compounds having the formula $Cl_3CSP(O)(OR)_2$ comprising reacting perchloro methyl mercaptan with a compound of the formula

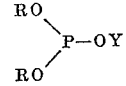

where R is selected from the group consisting of lower alkyl, phenyl and toluyl and Y is selected from the group consisting of lower alkyl, phenyl, toluyl and sodium while maintaining the temperature of the reaction mixture at approximately 10° C.

2. The process according to claim 1 where Y is lower alkyl.

3. The process according to claim 1 where Y is sodium.

4. The process for preparing a compound having the formula $Cl_3CSP(O)(OC_2H_5)_2$ comprising reacting perchloro methyl mercaptan with triethyl phosphite at around 10° C.

5. The process for preparing a compound having the formula $Cl_3CSP(O)(OC_4H_9)_2$ comprising reacting perchloro methyl mercaptan with tributyl phosphite at around 10° C.

6. The process for preparing a compound having the formula $Cl_3CSP(O)(OC_2H_5)_2$ comprising reacting perchloro methyl mercaptan with sodium diethyl hydrogen phosphite at around 10° C.

7. The process comprising reacting perchloro methyl mercaptan with tritoluyl phosphite at around 10° C.

8. As a composition of matter, compounds having the formula:

$$Cl_3CSP(O)(OR)_2$$

wherein R is selected from the group consisting of lower alkyl, phenyl and toluyl.

9. As a composition of matter, the compound having the formula:

$$Cl_3CSP(O)(OC_2H_5)_2$$

10. As a composition of matter, the compound having the formula:

$$Cl_3CSP(O)(OC_4H_9)_2$$

References Cited in the file of this patent

UNITED STATES PATENTS

| | | |
|---|---|---|
| 2,335,953 | McCracken et al. | Dec. 7, 1943 |
| 2,690,450 | Gilbert et al. | Sept. 28, 1954 |
| 2,690,451 | Gilbert et al. | Sept. 28, 1954 |